Aug. 18, 1953  F. H. HARDIE ET AL  2,649,550
REFLECTION ABSORBING ULTRASONIC WEDGE
Filed Oct. 26, 1950

INVENTORS.
FRED H. HARDIE
ROBERT C. GOODMAN
HOWARD E. VAN VALKENBURG

BY Joseph H. Lipschutz
ATTORNEY.

Patented Aug. 18, 1953

2,649,550

UNITED STATES PATENT OFFICE 2,649,550

REFLECTION ABSORBING ULTRASONIC WEDGE

Fred H. Hardie, Danbury, Robert C. Goodman, Bridgeport, and Howard E. Van Valkenburg, Danbury, Conn., assignors to Sperry Products, Inc., Danbury, Conn., a corporation of New York Application October 26, 1950, Serial No. 192,262

8 Claims. (Cl. 310—8.2)

1

This invention relates to the inspection of objects by the transmission therein of ultrasonic pulses which are reflected by reflecting surfaces, such as internal defects, within the object. By one method of inspection it has been found desirable to transmit the ultrasonic pulses into the object at an angle of incidence greater than zero, in other words, at an angle inclined to normal. To effect such transmission, an electro-acoustic transducer in the form of a piezo-electric crystal is mounted on one surface of a wedge which has another surface, at an angle to the first surface, in engagement with the object under test. An electrical pulse is generated and applied to the crystal which then transmits a mechanical pulse through the wedge and into the object at an angle determined by the wedge angle. While most of the vibrations transmitted into the wedge will pass through the wedge and into the object, some of the vibrations will be reflected at the interface between the wedge and object and will be reflected back to the crystal. The effect of these returned reflections will be to interfere with the received reflections from reflecting surfaces within the object, thus obscuring the indications of the internal conditions in the object.

It is therefore the principal object of this invention to provide a wedge which will have the property of attenuating the pulse reflections caused by the interface between wedge and object while permitting the pulse to travel into, and be received from, the object with relatively little attenuation.

Further objects and advantages of this invention will become apparent in the following detailed description thereof.

In the accompanying drawings.

Figure 1:
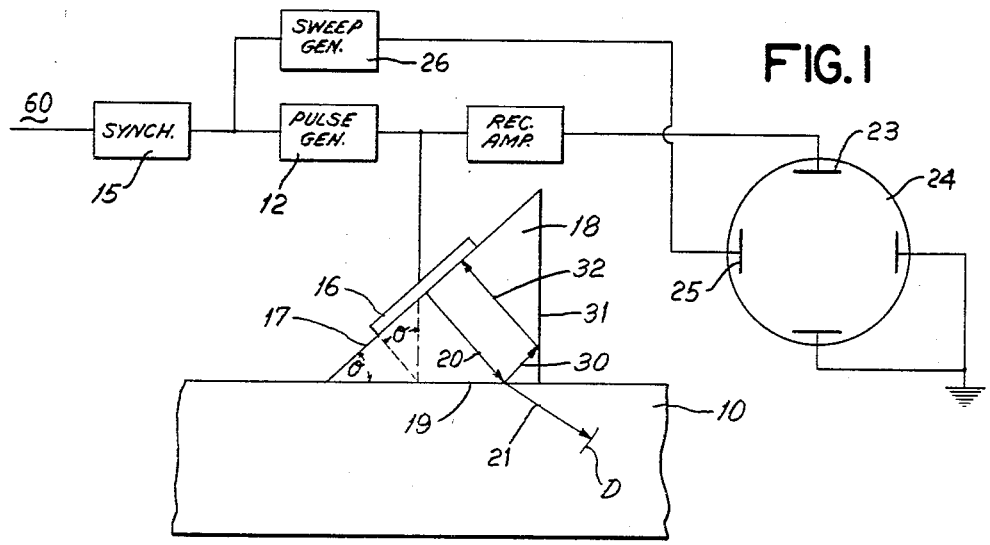
Fig. 1 is a front elevation, largely diagrammatic, of a crystal and wedge applied to an object and illustrating the problem involved in this invention.

Referring first to Fig. 1, there is shown a system as heretofore employed and embodying the problem which the present invention has solved. An object 10 is to be inspected for internal defects, such as fissure D, by means of ultrasonic pulses. These pulses are generated periodically by a pulse generator 12 which is periodically tripped by a synchronizer 15 energized from a suitable source of energy such as 60 cycle A. C.

2

The pulses are applied to a crystal 16 on one surface 17 of a wedge 18 whose other surface 19 is in engagement with a surface of object 10. Surface 17 is inclined with respect to surface 19 at an angle 0 which is the angle of incidence at which the pulses will strike the object 10. The path of the pulse is illustrated by the arrows. Arrow 20 is the line of transmission of the pulse which, upon striking object 10, is caused to enter the object and be refracted as shown by arrow 21. The refracted beam will be reflected by any internal reflecting surface, such as fissure D, and the reflected pulse will strike the crystal to generate a signal voltage. The signal voltage corresponding to an internal reflecting surface in object 10 can be indicated in any suitable manner, as, for instance, by applying it to the vertical plates 23 of an oscilloscope 24 whose sweep between horizontal plates 25 may be synchronized with the pulse generation by causing synchronizer 15 to energize the sweep circuit generator 26.

The problem which this invention seeks to solve arises from the fact that although most of the generated pulse energy enters the object along path 21, some of the pulse energy is reflected from the interface along the path indicated by arrow 30. The latter energy is reflected from wall 31 of the wedge heretofore used and finds its way back to the crystal along path indicated by arrow 32. The receipt of this energy will generate a signal voltage in the same manner as the energy reflected back from defect D, and will thus give rise to false indications of defects within object 10 as well as obscure the indications of true defects. By this invention means are provided for minimizing the effect of internal reflections of the pulse in the wedge without affecting the transmission and reception of pulse energy between the crystal and the object.

Figure 2:
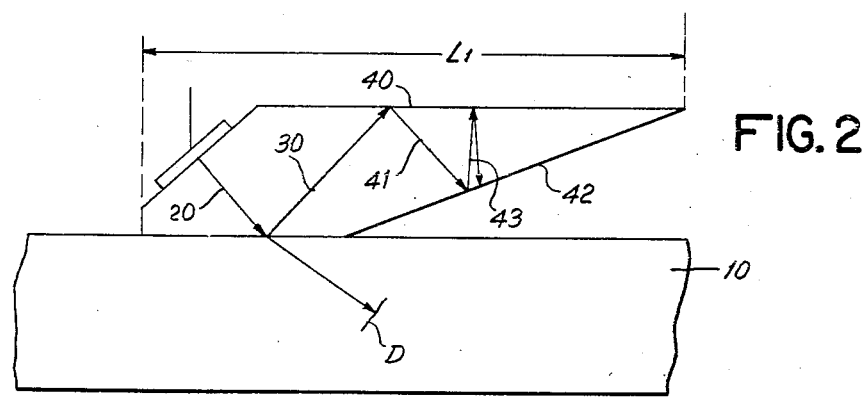
Fig. 2 is a view similar to Fig. 1 showing one form of this invention.

One solution of the problem is disclosed in Fig. 2. This solution consists essentially in providing a longer path for the reflections within the wedge before such reflections strike the crystal. For this purpose the wedge is formed with walls which intercept the successive reflections within the wedge at such angles as to direct them away from the crystal. Thus instead of conventitonal vertical surface 31 which will reflect beam 30 back to the crystal along path 32, there is provided a horizontal surface 40 designed to reflect beam 30 away from the crystal along path 41. Another wall 42 is provided to intercept the beam 41 at such angle as to direct its reflection 43 away from the crystal. Beam 43 will in turn strike surface 40 at such angle that it will once more be reflected away from the crystal. Thus, the internally reflected beam 30 is caused to travel a much longer path than in the conventional wedge shown in Fig. 1, and in so doing is greatly attenuated, when material of the proper attenuating properties is employed, so that should it eventually return to the crystal its energy will be diminished to the point where it can no longer interfere with the true indications of defects.

Figure 3:
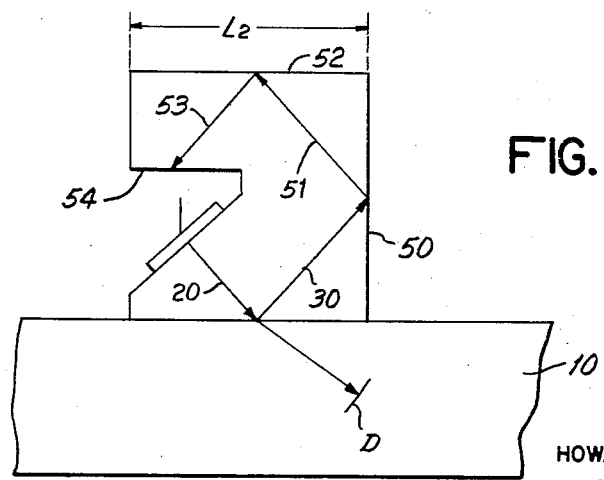
Fig. 3 is a view similar to Fig. 2 showing another form of this invention.

The form of invention shown in Fig. 2 may result in a wedge of greater lateral dimension than desired for some uses, and therefore the form shown in Fig. 3 has been devised which will yield the same result with a smaller lateral dimension. The first internal reflection 30 impinges on a surface 50 which is sufficiently upright so as to reflect the beam 30 back toward the crystal, but the surface 50 is spaced far enough away from the crystal so that the reflected beam 51 will be projected above the crystal. Beam 51 impinges on a surface 52 designed to continue to reflect the beam 53 toward the crystal. However, between the crystal and the returning beam 53' there is provided a surface 54 upon which beam 53 impinges so that said beam does not strike the crystal. In this manner, by turning the reflected beam back on itself but on a higher vertical level than the crystal, the beam is caused to travel a longer path within a laterally shorter, but vertically higher, wedge than the one shown in Fig. 2.

Having described our invention, what we claim and desire to secure by Letters Patent is:

1. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a third surface adapted to intercept the internally reflected pulse energy at an angle to direct the reflection away from the crystal.

2. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a plurality of additional surfaces adapted to intercept successively the internally reflected pulse energy, each of said additional surfaces being so positioned as to reflect the internally reflected pulse energy at an angle to direct the reflection away from the crystal.

3. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a third surface adapted to intercept the internally reflected pulse energy at an angle to direct the reflection away from the crystal, said wedge having an additional surface adapted to intercept the pulse energy reflected from said third surface, said additional surface being so positioned as to reflect the internally reflected pulse energy at an angle to direct the reflection toward, but at a different level from, the crystal.

4. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a third surface adapted to intercept the internally reflected pulse energy at an angle to direct the reflection away from the crystal, said wedge having additional surfaces adapted to intercept successively the internally reflected pulse energy, each of said additional surfaces being so positioned as to reflect the internally reflected pulse energy at an angle to direct the reflection toward, but at a different level from, the crystal.

5. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having means for attenuating the internally reflected pulse energy before it can return to the crystal, said last-named means comprising in said wedge an elongated path of travel for said internally reflected pulse energy in a direction away from the crystal.

6. In an ultrasonic inspection device in which ultrasonic pulses are transmitted into an object and reflections of the pulse are received from reflecting surfaces within the object, comprising a piezo-electricl crystal, a wedge having one surface in engagement with a surface of the object, the crystal engaging another surface of the wedge at an angle to the first surface, some of the pulse energy generated by the crystal being reflected within the wedge from the interface between wdge and object, and means for attenuating the internally reflected pulse energy before it can return to the crystal, said last-named means comprising in said wedge an elongated path of travel for said internally reflected pulse energy in a direction away from the crystal and returning in a direction toward, but at a different level from, the crystal.

7. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a plurality of additional surfaces, one of said additional surfaces being positioned to receive all of the energy reflected from the interface and to transmit said energy to another of said additional surfaces.

8. In an ultrasonic inspection device in which ultrasonic pulses are transmitted into an object and reflections of the pulse are received from reflecting surfaces within the object, comprising a piezo-electric crystal, a wedge having one surface in engagement with a surface of the object, the crystal engaging another surface of the wedge at an angle to the first surface, some of the pulse energy generated by the crystal being reflected within the wedge from the interface between wedge and object, said wedge having a plurality of additional surfaces, one of said additional surfaces being positioned to receive all of the energy reflected from the interface, the remaining additional surfaces being angularly positioned with respect to said first-named additional surface so as to successively receive the reflection of said energy from a preceding additional surface and transmit it to a succeeding additional surface.

FRED H. HARDIE.
ROBERT C. GOODMAN.
HOWARD E. VAN VALKENBURG.

References Cited in the file of this patent

UNITED STATES PATENTS

| Number | Name | Date |
|---|---|---|
| 2,525,861 | Carlin | Oct. 17, 1950 |
| 2,602,101 | Mesh | July 1, 1952 |
| 2,602,102 | Webb | July 1, 1952 |
| 2,628,335 | Drale | Feb. 10, 1953 |